United States Patent Office 3,121,084
Patented Feb. 11, 1964

3,121,084
SELECTED N,N,N'-TRISUBSTITUTED AMIDINES AND THEIR PREPARATION BY REACTION OF COMPOUNDS WITH -NH₂ GROUPS WITH AMIDE ACETALS
Hilmer E. Winberg, Wilmington, Del., assignor to E. I. du Pont de Nemours and Company, Wilmington, Del., a corporation of Delaware
No Drawing. Filed Sept. 17, 1962, Ser. No. 224,269
24 Claims. (Cl. 260—268)

This invention relates to, and has as its principal objects provision of, a new process for the preparation of N,N,N'-trisubstituted amidines and certain new such amidines.

This application is a continuation-in-part of my copending application Serial No. 91,570, filed Feb. 27, 1961, and now abandoned.

Completely substituted amidines, i.e., amidines wherein all hydrogen on both nitrogens of each amidine group has been replaced by substituent functions, have been made in the past, but only by routes involving the highly reactive phosphorus oxychloride in condensations between disubstituted formamides and the requisite amino-bearing compound, or by condensation of the desired mono- and dialkylamines with the highly reactive isocyanates.

It has now been found that 1,1-dihydrocarbonoxy tertiary monoamines, i.e., amide acetals and ketals, react with compounds containing —NH₂ groups to form completely substituted amidines in accord with the following stoichiometry:

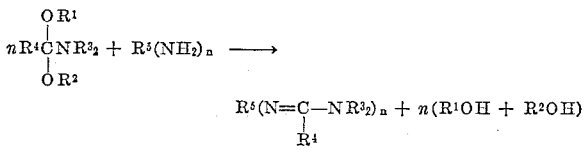

$$nR^4\overset{OR^1}{\underset{OR^2}{C}}NR^3{}_2 + R^5(NH_2)_n \longrightarrow$$

$$R^5(N=\underset{R^4}{C}-NR^3{}_2)_n + n(R^1OH + R^2OH)$$

wherein R¹ and R² are, individually, monovalent alkyl, aryl, aralkyl, alkaryl, or cycloalkyl hydrocarbon radicals, generally of no more than 8 carbons each, or, jointly, a single divalent alkylene radical forming with the two oxygens and intervening carbon a 1,3-dioxaheterocycle of from 5-7 ring members; the two R³ radicals, which may be alike or different, are monovalent R¹ or can be joined together in an alkylene radical to form with the intervening nitrogen a heterocycle of 5-7 ring members, in which case an additional oxa (—O—) or aza (>NR¹,R¹ being monovalent R¹ as above) heteroatom can be present in the ring; R⁴ is hydrogen or monovalent R¹; and n, The valence of R⁵, is an integer from 1 to 2, inclusive, R⁵ being selected from the group consisting, when n is 1, of monovalent hydrocarbon, amino-, halo-, nitro-, aminohalo-, aminonitro-, and halonitrohydrocarbon radicals of up to 12 carbons free of aliphatic unsaturation and Zerewitinov active hydrogen, there being 0-3 nitro groups and 0-3 halogens per radical, any halogen being of atomic number 9-35; monovalent acyl (Q—) including carbacyl $$(R^7-\overset{O}{\underset{\|}{C}}-)$$

hydrocarbonsulfonyl $$(R^7-\overset{O}{\underset{\|}{\underset{O}{S}}}-)$$

and di(hydrocarbonoxy)phosphinyl

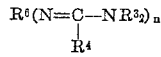

R⁷ being selected from the group consisting of monovalent hydrocarbon, halohydrocarbon and nitrohydrocarbon radicals of up to 12 carbons free of aliphatic unsaturation and Zerewitinov active hydrogen, there being 0-3 nitro groups and 0-3 halogens per radical, any halogen being of atomic number 9-35; acylamino (Q—NH—) and hydrocarbonoxycarbonyl

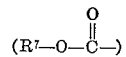

$$(R^7-O-\overset{O}{\underset{\|}{C}}-)$$

radicals, Q and R⁷ being as above; and, when n is 2, of divalent carbonyl (—CO—), sulfonyl (—SO₂—), 1,4-piperazinylene

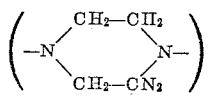

and 2,2-dicyanovinylidene [(CN)₂C=C<] radicals.

Of the products made by the new process of the present invention, those where n is 1 and R⁵ (here R⁶) is carbacyl $$(R^7-\overset{O}{\underset{\|}{C}}-)$$

di(hydrocarbonoxy)phosphinyl

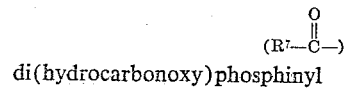

acylamino (Q—NH—) or hydrocarbonoxycarbonyl $$(R^7-O-\overset{O}{\underset{\|}{C}}-)$$

or where n is 2 and R⁶ is carbonyl, sulfonyl, 1,4-piperazinylene or 2,2-dicyanovinylidene are novel and form a part of the present invention. The formula of the novel compounds may be written as:

$$R^6(N=\underset{R^4}{C}-NR^3{}_2)_n$$

wherein n, R³, R⁴, R⁶, and R⁷ are as evident above.

The reaction is an easy one to carry out, requiring no particular conditions of solvent, temperature, pressure, or other reaction conditions. As is seen from the stoichiometry, the two hydrocarbonoxy fragments on the amide derivatives are condensed with the two hydrogens on the nitrogen of the requisite —NH₂ group in the coreactant and form two molecules of the corresponding alcohol or phenol. Thus, all that is needed to drive the reaction substantially to completion is to heat the two coreactants to temperatures wherein the hydroxy compound involved will distill from the reaction mixture. Actually, no solvent at all is required, but for ease and convenience the inert hydrocarbon or halohydrocarbon solvents are generally used in excess to effect good contact between the two coreactants. Since many of the lower alcohols form azeotropes with various of the hydrocarbon solvents, it frequently develops that the alcohol/hydrocarbon solvent azeotrope simply is distilled from the reaction mixture, and azeotrope formation ceases, the reaction is complete.

The following examples in which the parts given are by weight are submitted to illustrate the invention further but not to limit it.

*Example I*

A mixture of 44 parts of benzene, 4.35 parts of n-butyramide, and 5.95 parts of N,N-dimethylformamide dimethyl acetal, i.e., α,α - dimethoxytrimethylamine (one molar proportion based on the butyramide), was heated under reflux, with the benzene/methanol azeotrope, boiling at 58° C. at atmospheric pressure, being removed continuously as it was formed. Heating was continued until the azeotrope no longer distilled over, at which point the benzene was removed by evaporative distillation and the residue was purified by continued distillation under reduced pressure. There was thus obtained 4.0 parts (56% of theory) of N-n-butyryl-N',N'-dimethylformamidine as a clear, colorless liquid boiling at 86–88° C. under a pressure corresponding to 3 mm. of mercury; $n_D^{25}$, 1.4912–1.4920.

*Analysis.*—Calc'd. for $C_7H_{14}N_2O$: C, 59.0%; H, 9.8%; N, 19.7%. Found: C, 59.0%; H, 10.0%; N, 19.5%.

Example II

Example I was substantially duplicated using 6.05 parts of benzamide and 5.95 parts of dimethylformamide dimethyl acetal. On removal of the benzene solvent, a solid residue was obtained from which on recrystallization from a mixture of benzene and n-hexane there was obtained 6.6 parts (75% of theory) of N-benzoyl-N',N'-dimethylformamidine as white crystals melting at 73–74° C.

*Analysis.*—Calc'd. for $C_{10}H_{12}N_2O$: C, 68.1%; H, 6.8%; N, 16.5%. Found: C, 68.3%; H, 7.0%; N, 16.4%.

Example III

Example I was substantially duplicated using 9.3 parts of p-toluenesulfonylhydrazide and 5.95 parts of dimethylformamide dimethyl acetal. On removal of the benzene carrier, a solid residue was obtained from which on recrystallization from acetonitrile there was obtained 10.84 parts (89% of theory) of N,N-dimethyl-N'-p-tosylaminoformamidine as white crystals melting at 197–199° C. with decomposition.

*Analysis.*—Calcd. for $C_{10}H_{15}N_3SO_2$: C, 49.8%; H, 6.3%; N, 17.4%. Found: C, 49.7%; H, 6.4%; N, 17.3%.

Example IV

Example I was substantially duplicated using 4.95 parts of 2,4-dinitrophenylhydrazine and 3.0 parts of dimethylformamide dimethyl acetal. On removal of the benzene carrier, a solid residue was obtained from which on recrystallization from ethyl acetate there was obtained 6.05 parts (97% of theory) of N-(2,4-dinitroanilino)-N',N'-dimethylformamidine as black, metallic-like crystals melting at 238–240° C. with decomposition. In solution, the product is deep red and the ultraviolet spectrum obtained on a tetrahydrofuran solution of the product showed absorption peaks at 410 and 250 mμ with respective maximum extinction coefficients of 19,100 and 14,500.

*Analysis.*—Calcd. for $C_9H_{11}N_5O_4$: C, 42.7%; H, 4.4%; N, 27.6%. Found: C, 42.8%; H, 4.5%; N, 27.9%.

Example V

Example I was substantially duplicated using 7.65 parts of p-nitrophenylhydrazine and 5.95 parts of dimethylformamide dimethyl acetal. On removal of the benzene carrier, a solid residue was obtained from which, upon recrystallization from ethyl acetate, there was obtained 10.35 parts (97% of theory) of N-(p-nitroanilino)-N',N'-dimethylformamidine as black, metallic-like crystals melting at 167–171° C. with decomposition. Recrystallization from acetonitrile gave material with M.P. 169–171° C. A solution of the product in tetrahydrofuran exhibited maximum absorption peaks at 430 and 272 mμ with respective maximum extinction coefficients of 16,500 and 6,700.

*Analysis.*—Calcd. for $C_9H_{12}N_4O_2$: C, 51.9%; H, 5.8%; N, 26.9%. Found: C, 52.1%; H, 6.0%; N, 26.9%.

Example VI

Example I was substantially duplicated using 9.15 parts of 2,4-dinitroaniline and 5.95 parts of dimethylformamide dimethyl acetal. On removal of the benzene carrier, a solid residue was obtained from which on recrystallization from a mixture of benzene and n-hexane there was obtained 10.4 parts (89% of theory) of N,N-dimethyl-N'-(2,4-dinitrophenyl)formamidine as bright yellow needles melting at 107.5–108.5° C. An ethanol solution of the product exhibited maximum absorption peaks at 369 and 230 mμ with respective maximum extinction coefficients of 19,300 and 14,300.

*Analysis.*—Calcd. for $C_9H_{10}N_4O_4$: C, 45.4%; H, 4.2%; N, 23.5%. Found C, 45.5%; H, 4.4%; N, 23.3%.

Example VII

Example I was substantially duplicated using 6.0 parts of 1,1-dimethylhydrazine and 11.9 parts of dimethylformamide dimethyl acetal. Upon removal of the benzene carrier and subsequent continued distillation, there was obtained 9.02 parts (78% of theory) of N-dimethylamino-N',N'-dimethylformamidine as a clear, colorless liquid boiling at 140.0–140.5° C. at atmospheric pressure; $n_D^{25}$, 1.4565.

*Analysis.*—Calcd. for $C_5H_{13}N_3$: C, 52.1%; H, 11.3%; N, 36.5%. Found: C, 52.4%; H, 11.0%; N, 36.3%.

Example VIII

Example I was substantially duplicated using 16.2 parts of 3,4-dichloroaniline and 11.9 parts of dimethylformamide dimethyl acetal. Upon removal of the benzene carrier and continued subsequent distillation under reduced pressure, there was obtained 14.7 parts (68% of theory) of N,N-dimethyl-N'-(3,4-dichlorophenyl)formamidine as a clear, colorless liquid boiling at 136–140° C. under a pressure corresponding to 0.35 mm. of mercury; $n_D^{25}$, 1.6210.

*Analysis.*—Calcd. for $C_9H_{10}N_2Cl_2$: C, 49.8%; H, 4.6%; Cl, 32.6%. Found: C, 50.1%; H, 4.7%; Cl, 32.5.

Example IX

Example I was substantially duplicated using 3.0 parts of urea and 11.9 parts (2.0 molar proportions based on the urea) of dimethylformamide dimethyl acetal. Upon removal of the benzene carrier, a solid residue was obtained from which on recrystallization from benzene there was obtained 5.85 parts (69% of theory) of N,N'-bis(dimethylaminomethylene)urea as thick, white needles melting as 132–134° C.

*Analysis.*—Calcd. for $C_7H_{14}N_4O$: C, 49.5%; H, 8.3%; N, 32.9%. Found: C, 49.5%; H, 8.3%; N, 32.9%.

Example X

Example I was substantially duplicated using 11.6 parts of 1,4-diaminopiperazine and 23.8 parts (2.0 molar proportions based on the piperazine) of dimethylformamide dimethyl acetal. On removal of the benzene carrier, a solid residue was obtained from which on recrystallization from benzene there was obtained 21.5 parts (95% of theory) of 1,4-bis(dimethylaminomethyleneamino)piperazine as white needles melting at 158.0–159.5° C.

*Analysis.*—Calc'd. for $C_{10}H_{22}N_6$: C, 53.1%; H, 9.8%; N, 37.1%. Found: C, 52.9%; H, 9.8%; N, 37.1%.

Example XI (A) In a spherical glass reactor fitted with a thermometer, a mechanical stirrer, and a dropping funnel was placed a mixture of 10.2 parts of freshly opened commerical sodium methoxide and 133 parts of anhydrous tetrahydrofuran. The reaction mixture was protected with a blanket of nitrogen while approximately a .465 molar proportion charge (15 parts) of α,α-difluorobenzyldimethylamine (see U.S. 2,859,245) in 26.6 parts of anhydrous tetrahydrofuran was added dropwise with stirring over a period of one hour while maintaining the reaction mixture at between 20 and 30° C. by application of an external water bath as needed. After the addition was completed, the mixture was refluxed with stirring for a period of one hour. The solid sodium fluoride was then removed by filtration and the tetrahydrofuran solvent removed from the filtrate by distillation at reduced pressure. Continued distillation of the residue through a precision fractionation column afforded 7.85 parts (60% of theory) of the dimethyl acetal of N,N-dimethylbenzamide, i.e., α,α-dimethoxybenzyldimethylamine, as a clear, colorless liquid boiling at 65–68° C. under a pressure corresponding to 5 mm. of mercury; $n_D^{25}$, 1.5045.

*Analysis.*—Calc'd. for $C_{11}H_{17}NO_2$: C, 67.6%; H, 8.8%. Found: C, 67.4%; H, 8.7%.

(B) Example I was substantially duplicated using 9.8 parts of N,N-dimethylbenzamide dimethyl acetal, i.e., α,α-dimethoxybenzyldimethylamine, 8.12 parts of trichloroacetamide, and 44 parts of benzene. On removal of the benzene carrier, there was obtained 14.5 parts (99% of theory) of N,N-dimethyl-N'-trichloroacetylbenzamidine as a white crystalline solid which melted at 105° C. after recrystallization from n-hexane.

*Analysis.*—Calc'd. for $C_{11}H_{11}Cl_3N_2O$: C, 45.0%; H, 3.8%; N, 9.5%; Cl, 36.2%. Found: C, 45.0%; H, 3.9%; N, 9.4%; Cl, 35.9%.

Example XII

A mixture of 9.8 parts of α,α-dimethoxybenzyldimethylamine, 86 parts of p-toluenesulfonamide, and 44 parts of benzene was heated at the reflux, removing the benzene/methanol azeotrope as it was formed. When azeotrope formation had ceased, the reaction mixture was cooled and filtered. There was thus obtained 7.42 parts (49% of theory) of N,N-dimethyl-N'-(p-toluenesulfonyl)benzamidine as a white crystalline product which melted at 161–162.5° C. after recrystallization from acetonitrile.

*Analysis.*—Calc'd. for $C_{16}H_{18}N_2O_2S$: C, 63.6%; H, 6.0%; N, 9.3%; S, 10.6%. Found: C, 64.2%; H, 6.1%; N, 8.6%; S. 10.5%.

Example XIII

Example XII was substantially duplicated using 9.8 parts of α,α-dimethoxybenzyldimethylamine, 5.65 parts of trifluoroacetamide, and 44 parts of benzene. Upon completion of the reaction, the reaction mixture was cooled, filtered, and the solvent removed from the filtrate. The residue slowly crystallized. There was thus obtained N,N-dimethyl-N'-trifluoroacetylbenzamidine as colorless needles melting at 74.5–76° C. after crystallization from n-hexane.

*Analysis.*—Calc'd. for $C_{11}H_{11}F_3N_2O$: C, 54.1%; H, 4.5%; N, 11.5%; F, 23.3%. Found: C, 54.5%; H, 4.7%; N, 10.9%; F, 23.3%.

Example XIV

Example XIII was substantially duplicated using a mixture of 12.5 parts of N,N-dimethylformamide dimethyl acetal, 5.4 parts of 1,1-dicyano-2,2-diaminoethylene, and 26.4 parts of benzene. There was thus obtained 10.3 parts (95% of theory) of 1,1-dicyano-2,2-bis(N,N-dimethylaminomethyleneamino)ethylene as a crystalline solid melting at 152–153.5° C. after crystallization from ethyl alcohol.

*Analysis.*—Calc'd. for $C_{10}H_{14}N_6$: C, 55.0%; H, 6.5%; N, 38.5%. Found: C, 55.3%; H, 6.7%; N, 38.5%.

Example XV

A mixture of 9.87 parts of sulfamide, 27 parts (2.2 molar portions based on sulfamide) of dimethylformamide dimethyl acetal and 66 parts of benzene was heated at the reflux, removing the benzene/methanol azeotrope as it was formed. When azeotrope formation had ceased, the reaction mixture was cooled and filtered. There was thus obtained 20.9 parts (99% of theory) of N,N'-bis(dimethylaminomethylene)sulfamide as a white crystalline solid which melted at 193–194° C. after crystallization from alcohol.

*Analysis.*—Calc'd. for $C_6H_{14}N_4O_2S$: C, 35.3%; H, 6.0%. Found: C, 35.0%; H, 6.8%.

Example XVI

Example I was substantially duplicated using 16.6 parts of ethyl urethane and 22.2 parts of dimethylformamide dimethyl acetal. Upon removal of the benzene carrier and continued distillation there was obtained 25.0 parts (92.5% of theory) of N,N-dimethyl-N'-ethoxycarbonylformamidine as a water-soluble, colorless liquid boiling at 84–89° C. under a pressure corresponding to 0.30 mm. of mercury, $n_D^{25}$, 1.4912.

*Analysis.*—Calc'd. for $C_6H_{12}N_2O_2$: C, 50.0%; H, 8.4%; N, 19.4%. Found: C, 50.5%; H, 8.5%; N, 19.6%.

Example XVII

Example I was substantially duplicated using 18.5 parts of diphenyl aminophosphonate and 8.9 parts of dimethylformamide dimethyl acetal. Upon completion of the reaction, the reaction mixture was cooled, filtered, and the solvent removed from the filtrate. There was thus obtained 11 parts (49% of theory) of diphenyl dimethylaminomethyleneaminophosphonate melting at 92–93.5° C. after crystallization from ethyl acetate.

*Analysis.*—Calc'd. for $C_{15}H_{17}N_2O_3P$: C, 59.2%; H, 5.6%; N, 9.2%. Found: C, 59.1%; H, 5.8%; N, 9.0%.

Example XVIII

Example I was substantially duplicated using 31 parts of diethyl aminophosphonate and 31 parts of dimethylformamide dimethyl acetal. Upon completion of the reaction, the benzene carrier was removed by distillation. Continued distillation gave 28.1 parts (67% of theory) of diethyl dimethylaminomethyleneaminophosphonate as a colorless liquid boiling at 125–127° C. under a pressure corresponding to 0.15 mm. of mercury; $n_D^{25}$, 1.4691.

*Analysis.*—Calc'd. for $C_7H_{17}N_2O_3P$: C, 40.4%; H, 8.2%. Found: C, 40.1%; H, 8.6%.

This invention is generic to a new process for the preparation of N,N,N'-trisubstituted amidines by the condensation between N,N-dihydrocarbon substituted amide acetals and ketals and organic compounds containing free —NH₂ groups, and to certain of the new N,N,N'-trisubstituted amidines. The reaction involves a condensation between the requisite —NH₂ bearing compound and the desired amide acetal or ketal whereby the two hydrogens on each —NH₂ group in the coreactant unite with the two hydrocarbyloxy groups of the amide acetal to liberate two molar proportions of the resultant hydroxy-substituted hydrocarbon, e.g., alcohol or phenol, and form the doubly bonded nitrogen-carbon moiety of the desired amidine unit. The new triply substituted amidines involved are those wherein the carbon of each amidine unit involved carries hydrogen or monovalent alkyl, aryl, aralkyl, alkaryl, or cycloalkyl hydrocarbon radicals of generally no more than eight carbons each; the singly bonded nitrogen of each amidine unit carries two monovalent alkyl, aryl, alkaryl, aralkyl, or cycloalkyl hydrocarbon radicals of generally no more then eight carbons each, which in the case of the alkyl substituents can be together joined to form with the said monovalent amidine nitrogen a heterocycle of from five to seven ring members; and the doubly bonded nitrogen of each amidine unit is otherwise bonded to a monovalent hydrocarbon, halo-substituted hydrocarbon, or nitro-substituted hydrocarbon radical of no more than twelve carbons or to a monovalent acyl or haloacyl radical, including specifically halocarbacyl and carbacyl, i.e., an acyl radical of a carboxylic acid; di(hydrocarbonoxy)phosphinyl; carboxamido, i.e., hydrocarboncarbonylamino; hydrocarbonoxycarbonyl; sulfonamido, i.e., hydrocarbonsulfonylamino, and in the case of the diamidines to a divalent carbonyl, divalent sulfonyl, divalent 1,4-piperazinylene or divalent 2,2-dicyanovinylidene group.

The reaction is a simple one and requires no complicated procedures or equipment. Normally the reaction will be carried out under anhydrous conditions. Although no reaction solvent is necessary, to improve contact and thereby increase efficiency of reaction the reaction will generally be carried out with the amide acetal and the —NH₂ containing coreactant in solution in a hydrocarbon or halohydrocarbon solvent. Useful such hydrocarbon or halohydrocarbon solvents include the aromatic, aliphatic, alkaromatic, araliphatic, and cycloaliphatic hydrocarbon and halohydrocarbons, generally of no more than about 12 carbons. In all instances as described above, the reaction proceeds by a condensation between the amide acetal or ketal and the —NH₂ bearing coreactant resulting in the formation of two molar proportions of the hydroxy-substituted hydrocarbon corresponding to the two hydrocarbyloxy groups of the amide acetal or ketal.

As noted previously, in many instances the thus liberated hydroxyhydrocarbon, i.e., alcohol or phenol, forms a constant boiling azeotrope with the particular reaction solvent being used. In these instances the reaction will be effected simply by heating the reaction mixture comprising the amide acetal or ketal and the —NH₂ containing coreactants, in essentially equimolar proportions based on the number of —NH₂ groups in the coreactant, in the desired inert hydrocarbon or halohydrocarbon solvent and heating to the temperature at which the alcohol or phenol liberated from the condensation distills over as an azeotrope with the reaction solvent. The reaction will be continued under these conditions until no further formation of azeotrope occurs (generally from 30 minutes to no more than a few hours), at which point the condensation reaction is essentially complete. At this point, the remaining reaction solvents can be removed by a continued distillation, frequently best under reduced pressure, and the desired triply substituted amidine isolated from the residue either by distillation or by crystallization, depending on the boiling and melting points of the trisubstituted amidine product. In those instances wherein the trisubstituted amidine product is of higher carbon content and therefore of higher melting point and less solubility, it will not always be necessary to remove the excess reaction solvent since the trisubstituted product will separate out on cooling the reaction mixture after the cessation of alcohol or phenol formation.

The requisite amide acetal and ketal intermediates can be prepared by the method of Meerwein, Angew. Chem. 71, 530 (1959), by reaction between a hydrocarbon ether, a hydrocarbyl fluoride, and silver fluoborate to form a trihydrocarbonoxonium fluoborate which is then reacted with the requisite hydrocarbonamino-substituted carboxamide to form the intermediate oxonium fluoborate derivative of the amide, i.e., an α-(N,N-dihydrocarbonamino)-α-(hydrocarbonoxy)-hydrocarbon fluoborate which is subsequently further reacted with an alkali metal alcoholate to form the desired amide acetal or ketal and as a co-product the alkali metal fluoborate. Also, as disclosed in the same reference, the intermediate higher amide acetals and ketals can be prepared by alcohol exchange with the lower amide acetals and ketals in accord with the following stoichiometry:

$$R_2NCR''(OR')_2 + 2\ R'''OH \rightarrow R_2NCR''(OR''')_2 + 2\ R'OH$$

where $R'''$ is of greater carbon content than $R'$.

In view of the innate complexity of the silver fluoborate synthesis, the latter, i.e., the alcohol exchange route, will, for convenience reasons, generally by preferred. Thus, the silver fluoborate synthesis will normally be used to prepare the first member of the series, i.e., the dimethyl acetal of N,N-dimethylformamide, which will then be used in alcohol exchange to prepare any desired higher hydrocarbonoxy amide acetals. The same generally applies to any desired higher hydrocarbylamino amide acetals and ketals in which an amine exchange reaction in accord with the following stoichiometry will serve to prepare any desired higher hydrocarbonamino amide acetals and ketals:

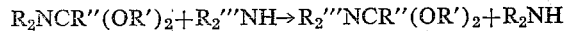

where $R'''$ is of greater carbon content than $R$.

In both these alcohol and amine exchange reactions, the cyclic products can also be obtained, i.e., by the use of a glycol to obtain the cyclic hydrocarbonoxy moiety or by use of a cyclic secondary amine to obtain the cyclic amino moiety of the amide acetals and ketals.

The preferred method of preparing the necessary intermediate amide acetals and ketals involves the reaction of an alkali metal or alkaline earth metal salt of the desired alcohol or phenol with the requisite α,α-dihalosubstituted tertiary amine in accord with the following stoichiometry:

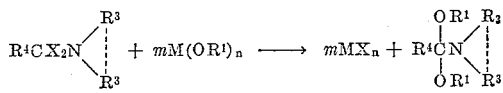

wherein the $R^3$ radicals which can be alike or different are monovalent hydrocarbon, halo-substituted hydrocarbon, or nitro-substituted hydrocarbon radicals of no more than eight carbons each, inclusive specifically in the hydrocarbon aspect of alkyl, cycloalkyl, aryl, aralkyl, and alkaryl radicals, which in the case of the alkyl variety can be together joined to form a saturated heterocycle of 5–7 ring members as indicated by the broken lines; $R^4$ is hydrogen or a monovalent alkyl, aryl, aralkyl, alkaryl, or cycloalkyl hydrocarbon radical of no more than eight carbons; the X's, which can be alike or different, are halogens of atomic number from 9–35; M is an alkali metal or an alkaline earth metal; $R^1$ is a monovalent alkyl, aryl, aralkyl, alkaryl, or cycloalkyl radical of no more than 8 carbons and, if there are two $R^1$'s present, they may be different or joined together in divalent alkylene of 2–4 carbons; and $m$ and $n$ are integers from 1–2, inclusive, depending on the valence of the metal M and such that $m+n=3$. This preferred synthesis of the intermediates forms the subject matter of Brown U.S. Pat. 3,092,637.

The new products of the present invention have been defined in the foregoing as triply substituted monoamidines in which the doubly bonded nitrogen of the amidine unit is singly linked to carbacyl, carboxamido, sulfonamido, dihydrocarbonoxyphosphinyl, or hydrocarbonoxycarbonyl groups, and for the diamidines as those in which each of the doubly bonded nitrogens of each amidine unit is singly linked to a bridging divalent carbonyl, sulfonyl, 1,4-piperazinylene, or dicyanovinylidene group. The process of the present invention is broader in scope as including the preparation not only of the just defined new triply substituted amidines but also of triply substituted amidines broadly and specifically inclusive of those such monoamidines in which the doubly bonded nitrogen of the amidine unit is singly linked to a monovalent amino or hydrazino or substituted amino or hydrazino radical or a monovalent hydrocarbon sulfonyl radical of the type, for instance, described in German Patent 949,285, the preparation of which involves the difficult-to-handle phosphorus oxychloride, or by Logemann et al., Ber. 90, 2527 (1957) or King, J. Org. Chem. 25, 352 (1960), involving the highly reactive and similarly difficult-to-handle p-toluenesulfonyl isocyanate.

In this connection it is to be noted that the POCl₃ technique does not permit synthesis of some of the present new products, e.g., the carbacyl amidines. Thus, the primary carboxamide intermediate needed for this type product is dehydrated to the corresponding nitrile by POCl₃ and none of the carbacyl amidine is obtained—see Seefelder et al., Angew. Chem. 72, 836 (1960).

In addition to the aforesaid defined new triply substituted amidines involving the carbacyl, carboxamido, carbonyl, sulfonyl, dicyanovinylidene, etc., substituents and the necessary amide acetal or ketal and —NH₂ containing coreactants given in the foregoing detailed examples, other such coreactants can be so similarly used to give still further species within the purview of the present broad product and process inventions. Thus, there can be used such other amide acetals and ketals as the following, which will be named in what is probably the more accepted terminology as dihydrocarbonoxy-substituted tertiary amines: (dimethoxymethyl)methyl-n-octylamine, (diethoxymethyl)diisobutylamine, N-dimethoxymethyl-N-methylaniline, N-dimethoxymethylpyrrolidine, N - diisopropylmethylmorpholine, N - diphenoxymethylpiperidine, N-α,α-diethoxybenzyl-N'-methylpiperazine, α,α-dimethoxyethyldibenzylamine, N-dimethoxymethyl - N,N',N'-trimethyl-p-phenylenediamine, dimethoxymethyldicyclohexylamine, α,α-p-trimethoxybenzyldimethylamine, α,α - n-hexyl-p-chlorobenzyldimethylamine, N - α,α - dimethoxy-p-chlorobenzyl-N-methyl-p-chloroaniline, N - α,α-diethoxy-p-nitrobenzyl-N-methyl-p-toluidine, and the like.

Similarly, there can be used in forming the new trisubstituted amidines of the present invention such —NH₂ bearing coreactants as chloroacetamide, dichloroacetamide, methoxyacetamide, cyanoacetamide, p-chlorobenzamide, o,p-dichlorobenzamide, p-nitrobenzamide, p-cyanobenzamide, p-dimethylaminobenzamide, p-chlorophenylhydrazine, p-cyanophenylhydrazine, cyclohexylhydrazine, N-benzoylhydrazine and the like.

Using the operating conditions outlined in the foregoing fully detailed examples and the specific amide acetals and ketals and —NH₂ containing reactants just named taken pairwise in the respective order given, there will be obtained the following additional trisubstituted amidines of the present invention: N-chloroacetyl-N'-methyl-N' - n-octylformamidine, N - dichloroacetyl-N',N'-diisobutylformamidine, N-methoxyacetyl-N'-methyl-N'-phenylformamidine, N-(cyanoacetyliminomethyl)-pyrrolidine, i.e., N-cyanoacetyl-N'-N'-tetramethyleneformamidine, N-(p - chlorobenzoylaminomethyl)morpholine, i.e., N-p-chlorobenzoyl - N',N'-3-oxapentamethyleneformamidine, N-(o,p-dichlorobenzoyliminomethyl)piperidine, i.e., N-(o,p - dichlorobenzoyl - N',N'-pentamethylene)formamidine, 1-[α-(p-nitrobenzoylimino)benzyl]-4-methyl-piperidine, i.e., N-p-nitrobenzoyl-N',N'-3-methyl-3-azapentamethylenebenzamidine, N - p-cyanobenzoyl-N',N'-dibenzoylacetamidine, N-p-dimethylaminobenzoyl-N'-methyl-N'-(p-dimethylaminophenyl)formamidine, N,N-dicyclohexyl-N'-p-methoxybenzoylformamidine, N-p-chloroanilino-N',N'-dimethyl-p-methoxybenzamidine, N-p-cyanoanilino - N',N'-dimethyl-p-chlorobenzamidine, N-cyclohexylamino - N'-methyl-N'-p-chlorophenyl-p-chlorobenzamidine, N - methyl-N-p-tolyl-N'-benzamido-p-nitrobenzamidine, and the like.

The new trisubstituted amidines of the present invention are useful as preemergence and postemergence herbicides. The products are particularly outstanding in the light of these properties since they possess such remarkable hydrolytic stability in contrast to previously known amidines which are well known to possess poor hydrolytic stability. The new trisubstituted amidines of the present invention containing a multiplicity of the strongly chromophoric and auxochromophoric substituents, e.g., the products from p-nitrophenyl- and o,p-dinitrophenylhydrazines, are deeply colored and are useful as coloring agents. Solutions of these colored trisubstituted amidines, even in organic solvents, exhibit high tinctorial strength and stability, and accordingly are useful as such for direct application to preformed objects, such as films, fibers, papers, batts, and the like, to render the said objects colored. The colored trisubstituted amidines are also useful as direct coloring agents in organic solvents, e.g., for use as a so-called gasoline or fuel dye, and the like.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting together:
   (A) a compound of the formula

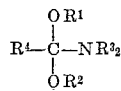

wherein:
   $R^1$ and $R^2$ are selected from the group consisting, individually, of monovalent alkyl, aryl, aralkyl, alkaryl and cycloalkyl hydrocarbon of up to 8 carbons and, jointly, of divalent alkylene of 2–4 carbons;
   the two $R^3$ radicals are selected from the group consisting, individually, of monovalent $R^1$ and, jointly, of divalent alkylene, oxygen-interrupted alkylene and >NR¹-interrupted alkylene of a chain length of 4–6 atoms, $R^1$ being monovalent; and
   $R^4$ is selected from the group consisting of hydrogen and monovalent $R^1$; and
   (B) a compound of the formula $$R^5(NH_2)_n$$

wherein:
   $n$ is an integer of from 1 to 2, the valence of $R^5$, $R^5$ being selected from the group consisting,
   when $n$ is 1, of monovalent hydrocarbon, amino-, halo-, nitro-, aminohalo-, aminonitro-, and halonitrohydrocarbon radicals of up to 12 carbons free of aliphatic unsaturation and Zerewitinov active hydrogen, there being 0–3 nitro groups and 0–3 halogens per radical, any halogen being of atomic number 9–35; monovalent acyl (Q) including carbacyl

hydrocarbonsulfonyl

and di(hydrocarbonoxy)phosphinyl

$R^7$ being selected from the group consisting of monovalent hydrocarbon, halohydrocarbon and nitrohydrocarbon radicals of up to 12 carbons free of aliphatic unsaturation and Zerewitinov active hydrogen, there being 0–3 nitro groups and 0–3 halogens per radical, any halogen being of atomic number 9–35; acylamino (Q—NH—) and hydrocarbonoxycarbonyl

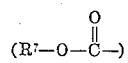

Q and $R^7$ being as above; and
   when $n$ is 2, of divalent carbonyl, sulfonyl, 1,4-piperazinylene and 2,2-dicyanovinylidene.

2. The process of claim 1 accomplished in an inert reaction medium.

3. The process which comprises reacting together α,α-dimethoxytrimethylamine and n-butyramide.

4. The process which comprises reacting together α,α-dimethoxytrimethylamine and benzamide.

5. The process which comprises reacting together α,α-dimethoxytrimethylamine and p - toluenesulfonylhydrazide.

6. The process which comprises reacting together α,α-dimethoxytrimethylamine and urea.

7. The process which comprises reacting together α,α-dimethoxytrimethylamine and p-toluenesulfonamide.

8. The process which comprises reacting together α,α-dimethoxytrimethylamine and diphenyl aminophosphonate.

9. The process which comprises reacting together α,α-dimethoxybenzyldimethylamine and trichloroacetamide.

10. The process which comprises reacting together α,α-dimethoxybenzyldimethylamine and p-toluenesulfonamide.

11. The process which comprises reacting together α,α-dimethoxybenzyldimethylamine and trifluoroacetamide.

12. A compound of the formula

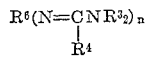

wherein:
- the two $R^3$ radicals are selected from the group consisting, individually, of monovalent alkyl, aryl, aralkyl, alkaryl, and cycloalkyl hydrocarbon of up to 8 carbons and, jointly, of divalent alkylene, oxygen-interrupted alkylene and $>NR^1$-interrupted alkylene of a chain length of 4–6 atoms, $R^1$ being selected from the group consisting of monovalent alkyl, aryl, aralkyl, alkaryl and cycloalkyl hydrocarbon of up to 8 carbons; $R^4$ is selected from the group consisting of hydrogen and alkyl, aryl, aralkyl, alkaryl and cycloalkyl hydrocarbon of up to 8 carbons; and
- $n$ is an integer of from 1 to 2, the valence of $R^6$, $R^6$ being selected from the group consisting,
- when $n$ is 1, of carbacyl

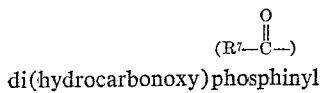

di(hydrocarbonoxy)phosphinyl

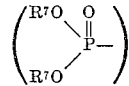

$R^7$ being selected from the group consisting of monovalent hydrocarbon, halohydrocarbon and nitrohydrocarbon radicals of up to 12 carbons free of aliphatic unsaturation and Zerewitinov active hydrogen, there being 0–3 nitro groups and 0–3 halogens per radical, any halogen being of atomic number 9–35; acylamino (Q—NH—) and hydrocarbonoxycarbonyl

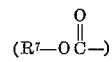

Q and $R^7$ being as above; and
when $n$ is 2, of divalent carbonyl, sulfonyl, 1,4-piperazinylene and 2,2-dicyanovinylidine.

13. N-n-butyryl-N',N'-dimethylformamidine.
14. N-benzoyl-N',N'-dimethylformamidine.
15. N,N-dimethyl-N'-p-tosylaminoformamidine.
16. N,N'-bis(dimethylaminomethylene)urea.
17. 1,4 - bis(dimethylaminomethyleneamino)piperazine.
18. N,N-dimethyl-N'-trichloroacetylbenzamidine.
19. N,N-dimethyl-N'-trifluoroacetylbenzamidine.
20. 1,1 - dicyano - 2,2 - bis(N,N - dimethylaminomethyleneamino)ethylene.
21. N,N'-bis(dimethylaminomethylene)sulfamide.
22. N,N-dimethyl-N'-ethoxycarbonylformamidine.
23. Diphenyl dimethylaminomethyleneaminophosphonate.
24. Diethyl dimethylaminomethyleneaminophosphonate.

No references cited.